Patented July 12, 1927.

1,635,212

UNITED STATES PATENT OFFICE.

CLARENCE J. HERRLY, OF PITTSBURGH, PENNSYLVANIA, ASSIGNOR TO THE PREST-O-LITE COMPANY, INC., A CORPORATION OF NEW YORK.

LIME-SLUDGE PRODUCT AND PROCESS OF MAKING THE SAME.

No Drawing. Application filed February 19, 1924. Serial No. 693,897.

This invention relates to processes and compositions for making blocks, slabs, tiles, or the like, suitable for various purposes in building operations. More specifically, the invention comprises the shaping and heat treatment of plastic compositions containing as an essential ingredient the lime sludge formed as a by-product in certain industries. An example of such sludge is the residue left on the decomposition of calcium carbid to produce acetylene.

In accordance with a preferred form of the present process, lime sludge is associated with cellulosic material and with an inorganic water absorbing or thickening material. Plastics of this general character have heretofore been described, but by means of certain novel features of composition and by the baking operation which forms an important part of this invention, I am able to obtain valuable results new in the art.

The lime sludge is preferably used in the form of a pasty mass, which may contain about 50% solid matter, principally calcium hydroxid, and 50% uncombined water. Disintegrated wood is thoroughly mixed with the sludge and a pulverulent, inorganic material having absorptive properties is worked into the mixture. This material will generally be siliceous and have cementitious properties, either inherent or by virtue of association with the lime. The order in which the materials are added is not important. Apparatus for mixing and for making blocks or the like is well known in the art and need not be described here.

The proportions of lime sludge, cellulosic material, and inorganic water absorbing material may vary widely, depending on the qualities sought in the finished product. The lime sludge may be treated for the removal of a portion of its water in a suitable apparatus, such as a Dorr or Genter thickener. This is desirable if the content of solid matter is less than 40-50%. The thickened sludge may comprise from 33% to 85% of the composition. If a very light product is required, the amount of cellulosic material may be as high as 33%. A desirable lower limit is 5%. The cementitious material should not generally exceed 40% and may be as low as 10%.

As illustrative, it may be said that good results are obtained with a composition comprising 85 parts by weight of thickened lime sludge, 5 parts of disintegrated wood, and 10 parts of ground coal ashes or ground metallurgical slag. This composition works up very smoothly. If equal weights of the ingredients are used, the setting is considerably hastened.

I have discovered that the time required for setting may be reduced by the use of one or more substances such as ammonium chlorid, ferrous sulfate, sodium silicate, iron filings, niter cake, calcium acid sulfate, or sulfuric acid. Only small amounts of such accelerating substances are required, for example about ½% to 2% of the weight of the composition. They should be added towards the end of the mixing operation and thoroughly incorporated with the bulk of the material.

Lime sludge which has been superficially converted into carbonate, as by exposure to the air, may nevertheless be used with good results. All lumps should be crushed and the material thoroughly mixed.

The cellulosic material used in the improved composition may be wood sawdust, slivers, or shavings, excelsior, rope fiber, ground corn cobs, ground cork, or similar material. As the inorganic water absorbing or thickening ingredient I may use, beside ground ashes or slag, one or more such substances as sand, clay, kelly cake (impure alumina), or the like. In some cases fibrous asbestos or hair may be added with advantage. The materials in each class referred to may be added to the composition singly or in admixture with other members of the class.

An important industrial advantage of my invention is the elimination of Portland cement, plaster of Paris and other cementitious materials of commerce which have previously been used in lime sludge compositions. I have found that excellent results may be obtained by the use of normally waste products only, as indicated in the preceding paragraph. Important economy in manufacture is attained for this reason. In accordance with the present invention it is unnecessary to dry the sludge, as heretofore proposed, and a further very material saving is effected by the omission of the expensive drying operation.

The baking of the blocks and the like, which as above noted constitutes an important feature of the process, comprises heating them to a temperature materially in excess of 200° C. For best results, the temperature under usual conditions should be between 350° and 700° C. The blocks may be heated as soon as formed or after a preliminary drying in the air or by artificial means. Suitable mechanical means may be provided for passing the freshly formed blocks to the heating zone. They can not practically be handled individually unless given a preliminary drying, for example by eight to twelve hours exposure to the air.

I prefer to bake the blocks when first formed, this generally obviates the necessity of using accelerators and results in the production of an exceptionally strong block in a short time.

The hardening and strengthening of the mass by the heating appears to be due chiefly to the formation of calcium and aluminum silicates and to the action of decomposition products of the cellulosic material, especially carbon dioxid, upon the lime. Blocks or the like baked at elevated temperatures are much superior to those in which drying and setting take place at atmospheric temperature or under low heat. The baked blocks are strong, light in weight, and not objectionably absorbent. Nails may be driven into them without causing splitting or cracking, and they may be readily cut or sawed into the desired size. These characteristics make the product especially suitable for partition blocks, but it has a wide variety of other uses.

I claim:

1. Process of making building blocks and the like, comprising mixing together lime sludge, a cellulosic material, and an inorganic water absorbing material to form a plastic composition; shaping the composition; and baking the shaped product at a temperature in excess of 200° C.

2. Process of making building blocks and the like, comprising mixing together lime sludge, a cellulosic material, and an inorganic water absorbing material to form a plastic composition; shaping the composition; and heating the shaped product to between 350° and 700° C.

3. Process of making building blocks and the like, comprising mixing together lime sludge, a cellulosic material, and an inorganic water absorbing material to form a plastic composition; shaping the composition; drying the shaped product in the air from 8 to 10 hours; and then baking at a temperature in excess of 200° C.

4. Process of making building blocks and the like, comprising mixing together lime sludge, a cellulosic material, and an inorganic water absorbing material to form a plastic composition; incorporating with the composition toward the end of the mixing period a substance adapted to accelerate setting; shaping the composition; and baking the shaped product at a temperature in excess of 200° C.

5. A composition for making building blocks or the like, comprising pasty lime sludge about 85% by weight, disintegrated wood waste about 5%, and ground coal ashes about 10%.

6. A building block or the like such as may be made by heating a composition comprising lime sludge, cellulosic material, an inorganic waste material having water absorbing and cementitious properties, and a substance adapted to accelerate the setting of the composition to a temperature in excess of 200° C.

7. A building block or the like such as may be made by heating a composition comprising lime sludge, cellulosic material, and an inorganic water absorbing material to a temperature in excess of 200° C.

8. A building block or the like such as may be made by heating a composition comprising lime sludge, cellulosic material, and a water absorbing cementitious material to a temperature between 350° and 750° C.

9. A building block or the like such as may be made by heating to a temperature between 350° and 750° C. a composition comprising pasty lime sludge from 33% to 85% by weight, disintegrated wood waste from about 5% to 33%, and inorganic waste material having water absorbing properties from about 10% to 40%.

In testimony whereof, I affix my signature.

CLARENCE J. HERRLY.